United States Patent
Palanki et al.

(10) Patent No.: US 8,249,029 B2
(45) Date of Patent: Aug. 21, 2012

(54) LOW REUSE PREAMBLE FOR A WIRELESS COMMUNICATION NETWORK

(75) Inventors: Ravi Palanki, San Diego, CA (US); Aamod D. Khandekar, San Diego, CA (US); Avneesh Agrawal, San Diego, CA (US); Dexu Lin, San Diego, CA (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 590 days.

(21) Appl. No.: 12/410,358

(22) Filed: Mar. 24, 2009

(65) Prior Publication Data

US 2009/0247172 A1    Oct. 1, 2009

Related U.S. Application Data

(60) Provisional application No. 61/040,308, filed on Mar. 28, 2008, provisional application No. 61/054,069, filed on May 16, 2008.

(51) Int. Cl.
*H04B 7/216* (2006.01)

(52) U.S. Cl. ........ 370/335; 370/337; 370/342; 370/344; 370/437

(58) Field of Classification Search .......... None
See application file for complete search history.

(56) References Cited

U.S. PATENT DOCUMENTS

| | | |
|---|---|---|
| 7,778,151 B2 * | 8/2010 | Bertrand et al. ............ 370/208 |
| 2005/0147024 A1 * | 7/2005 | Jung et al. .................... 370/203 |
| 2006/0050799 A1 | 3/2006 | Hou et al. .................... 375/260 |
| 2007/0217353 A1 * | 9/2007 | Asa et al. ..................... 370/315 |
| 2010/0165894 A1 * | 7/2010 | Furuskar et al. ............ 370/281 |

FOREIGN PATENT DOCUMENTS

EP    1718021 A1    11/2006

OTHER PUBLICATIONS

International Search Report & Written Opinion—PCT/US2009/038461, International Search Authority—European Patent Office—Aug. 25, 2009.
Michael Wang, et al., "Preamble Design in Ultra Mobile Broadband Communication Systems" IEEE International Workshop on Signal Design and Its Applications in Communications, Sep. 23, 2007, pp. 328-333, XP031194263.
Taiwan Search Report—TW098110192—TIPO—May 11, 2012.

\* cited by examiner

*Primary Examiner* — Chi H. Pham
*Assistant Examiner* — Shick Horn

(57) ABSTRACT

Techniques for sending low reuse preambles in a wireless network are described. In an aspect, a base station may send a low reuse preamble on reserved frequency resources to allow terminals to detect the base station even in the presence of strong interfering base stations. The base station may generate the low reuse preamble to include a pilot portion and a data portion. The base station may determine frequency resources reserved for sending low reuse preambles by base stations. The base station may then send the low reuse preamble on the reserved frequency resources, e.g., at a pseudo-randomly selected time. A terminal may detect for low reuse preambles sent by the base stations on the reserved frequency resources. The terminal may recover information for a base station from a detected low reuse preamble.

39 Claims, 11 Drawing Sheets

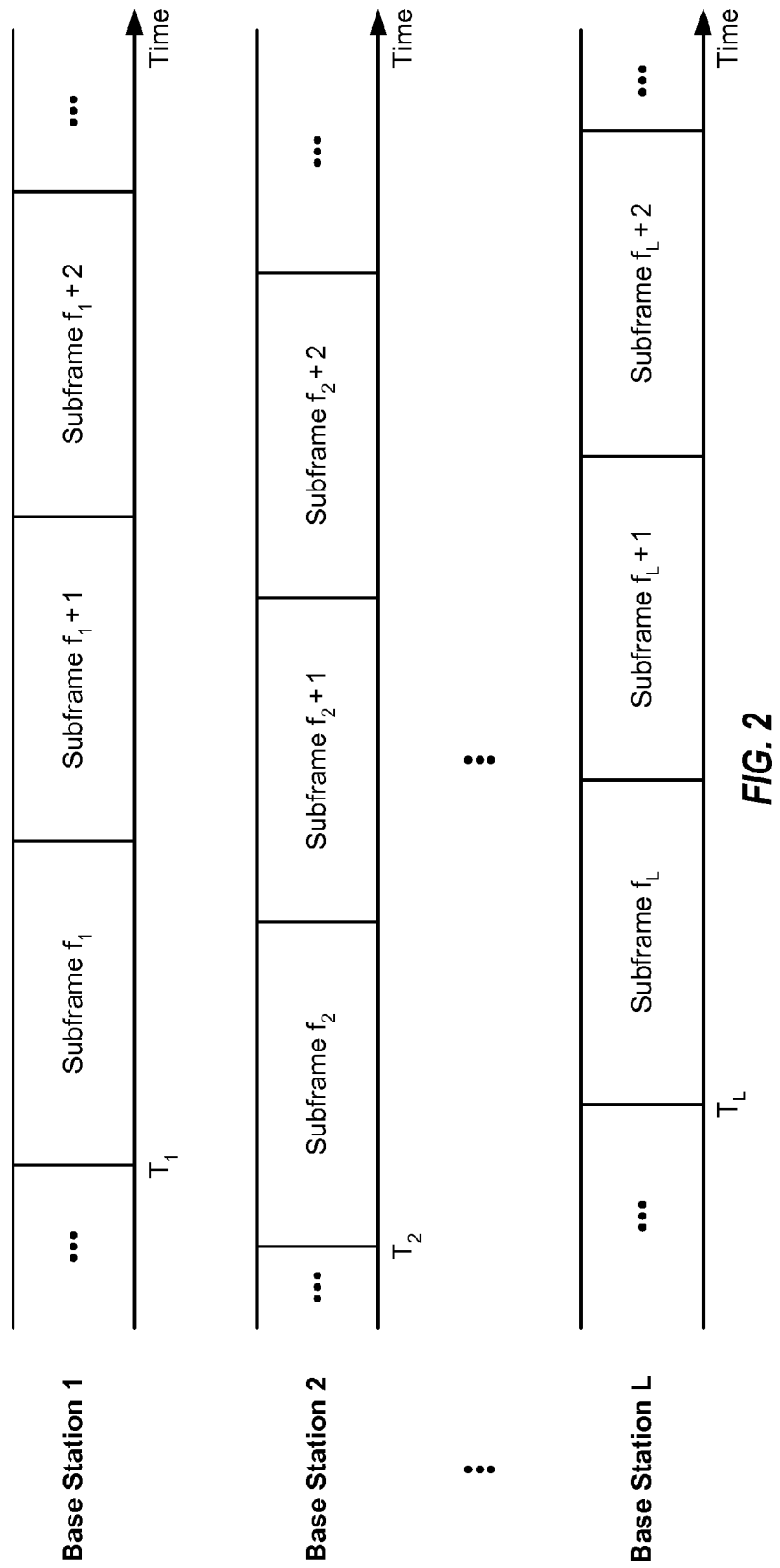

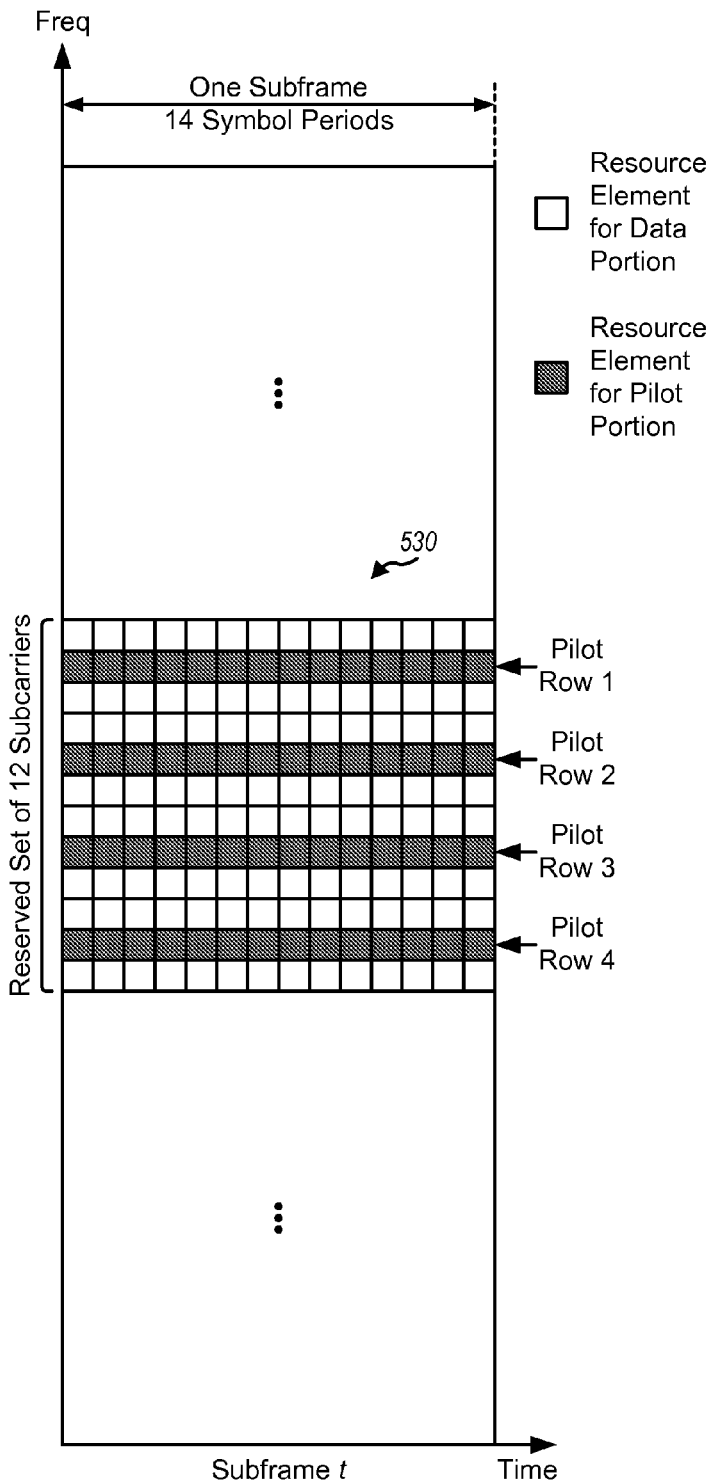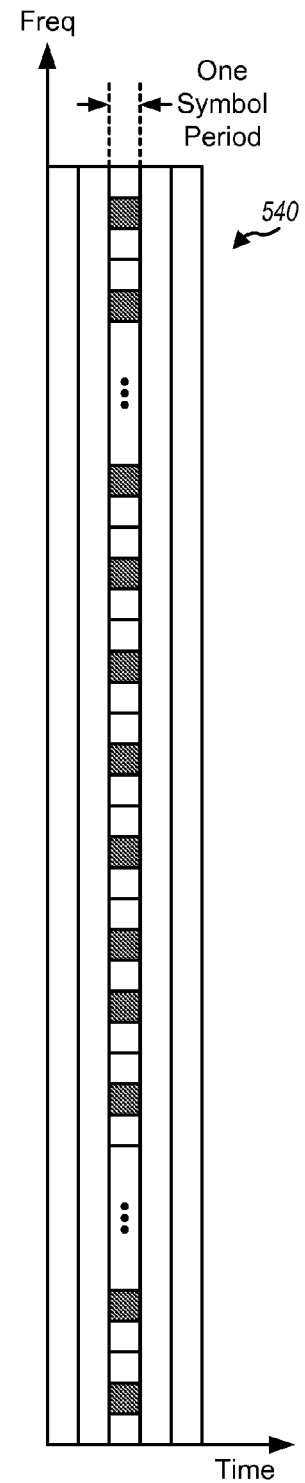
FIG. 5C
FIG. 5D

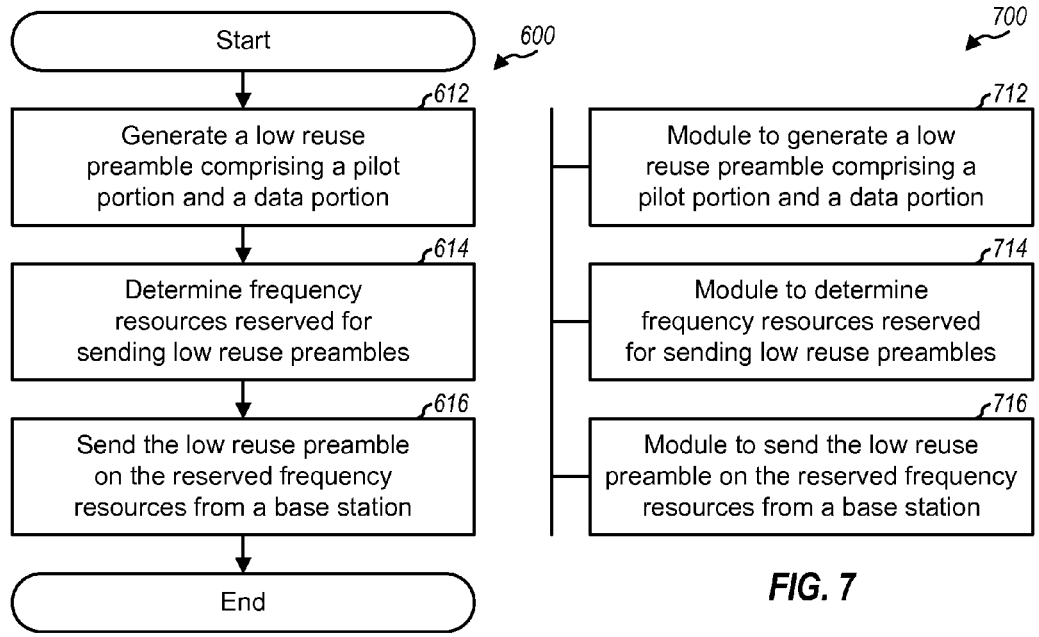
FIG. 6
FIG. 7
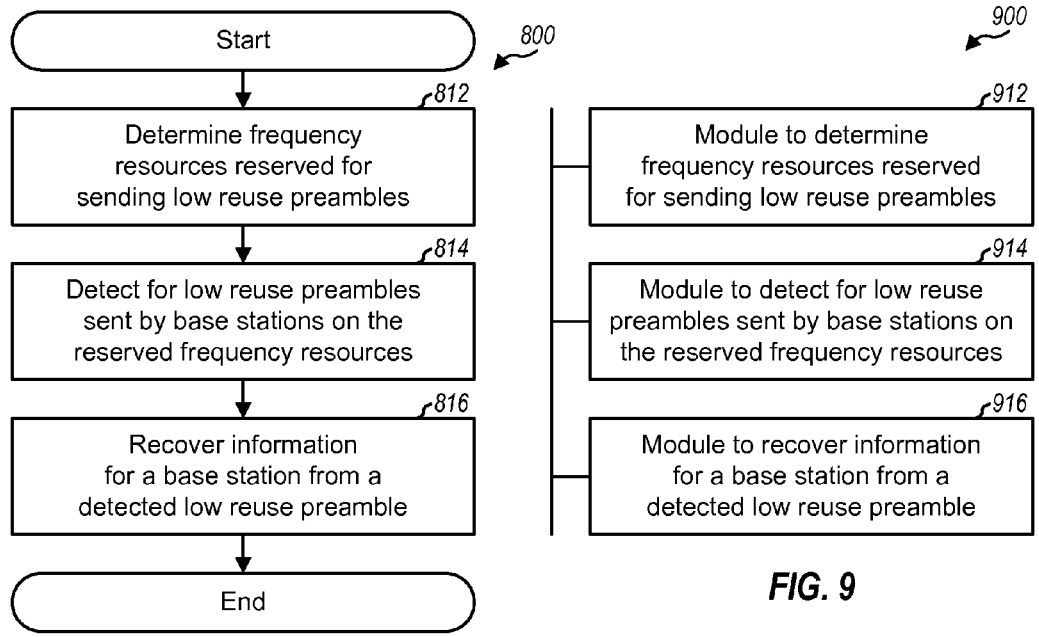
FIG. 8
FIG. 9

LOW REUSE PREAMBLE FOR A WIRELESS COMMUNICATION NETWORK

The present application claims priority to provisional U.S. Application Ser. No. 61/040,308, entitled "ASYNCHRONOUS REUSE PREAMBLE," filed Mar. 28, 2008, and provisional U.S. Application Ser. No. 61/054,069, entitled "ASYNCHRONOUS REUSE PREAMBLE," filed May 16, 2008, both assigned to the assignee hereof and incorporated herein by reference.

BACKGROUND

I. Field

The present disclosure relates generally to communication, and more specifically to techniques for transmitting information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A base station may send a transmission to allow terminals to detect the base station. The transmission may also carry information that may be used by the terminals to communicate with the base station. It is desirable to efficiently and reliably send the transmission.

SUMMARY

Techniques for sending low reuse preambles (LRPs) in a wireless network are described herein. In an aspect, a base station may send a low reuse preamble on reserved frequency resources to allow terminals to detect the base station even in the presence of high interference from strong base stations. A low reuse preamble is a transmission sent with low reuse so that it can be detected even by terminals observing high interference. Low reuse refers to different base stations sending transmissions (e.g., preambles) on different resources all or most of the time, thereby reducing interference and ensuring that even preambles of relatively weak base stations can be detected.

In one design, a base station may generate a low reuse preamble comprising a pilot portion and a data portion. The pilot portion may comprise pilot symbols used for detection of the low reuse preamble. The data portion may comprise information for the base station. The base station may determine frequency resources reserved for sending low reuse preambles by base stations, e.g., asynchronous base stations. The base station may then send the low reuse preamble on the reserved frequency resources, e.g., at a pseudo-randomly selected time.

In one design, a terminal may determine frequency resources reserved for sending low reuse preambles by base stations, e.g., asynchronous base stations. The terminal may detect for low reuse preambles sent by the base stations on the reserved frequency resources. The terminal may detect for the low reuse preambles based on the pilot portion. The terminal may recover information for a base station from the data portion of a detected low reuse preamble.

Various aspects and features of the disclosure are described in further detail below.

BRIEF DESCRIPTION OF THE DRAWINGS

FIG. 2 shows asynchronous operation by multiple base stations.

FIGS. 5A to 5D show four designs of a low reuse preamble.

FIG. 6 shows a process for sending a low reuse preamble.

FIG. 7 shows an apparatus for sending a low reuse preamble.

FIG. 8 shows a process for receiving low reuse preambles.

FIG. 9 shows an apparatus for receiving low reuse preambles.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
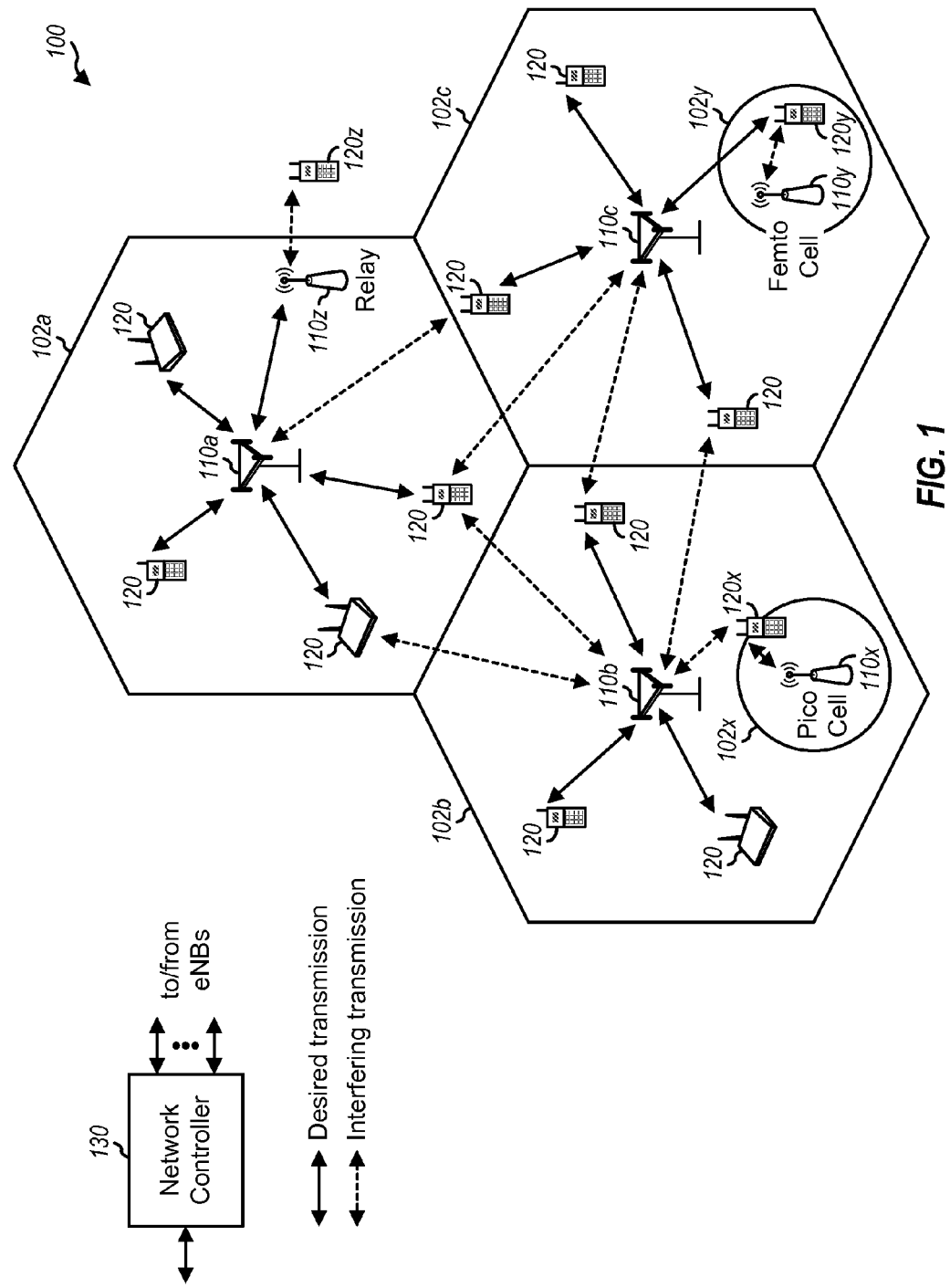
FIG. 1 shows a wireless communication network.

FIG. 1 shows a wireless communication network 100, which may include a number of base stations 110 and other network entities. A base station may be a station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, and/or other types of cell.

A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG). The CSG may include terminals for users in a home, terminals for users subscribing to a special service plan, etc. A base station for a macro cell may be referred to as a macro base station. A base station for a pico cell may be referred to as a pico base station. A base station for a femto cell may be referred to as a femto base station or a home base station.

In the example shown in FIG. 1, base stations 110a, 110b and 110c may be macro base stations for macro cells 102a, 102b and 102c, respectively. Base station 110x may be a pico base station for a pico cell 102x. Base station 110y may be a femto base station for a femto cell 102y. Although not shown in FIG. 1 for simplicity, the macro cells may overlap at the edges. The pico and femto cells may be located within the macro cells (as shown in FIG. 1) or may overlap with macro cells and/or other cells.

Wireless network 100 may also include relay stations, e.g., a relay station 110z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 130 may couple to a set of base stations and provide coordination and control for these base stations. Network controller 130 may be a single network entity or a collection of network entities. Network controller 130 may communicate with base stations 110 via a backhaul. Base stations 110 may also communicate with one another, e.g., directly or indirectly via wireless or wireline backhaul.

Wireless network 100 may be a homogeneous network that includes only macro base stations (not shown in FIG. 1). Wireless network 100 may also be a heterogeneous network that includes base stations of different types, e.g., macro base stations, pico base stations, home base stations, relay stations, etc. These different types of base stations may have different transmit power levels, different coverage areas, and different impact on interference in wireless network 100. For example, macro base stations may have a high transmit power level (e.g., 20 Watts) whereas pico and femto base stations may have a low transmit power level (e.g., 1 Watt). The techniques described herein may be used for homogeneous and heterogeneous networks.

Terminals 120 may be dispersed throughout wireless network 100, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 1, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 100 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

FIG. 2 shows an example of asynchronous operation by multiple (L) base stations 1 through L. For each base station, the horizontal axis may represent time, and the vertical axis may represent frequency or transmit power. The transmission timeline for each base station may be partitioned into units of subframes. Each subframe may have a predetermined duration, e.g., 1 millisecond (ms). A subframe may also be referred to as a frame, etc. In LTE, each subframe covers two slots, and each slot covers six symbol periods for an extended cyclic prefix or seven symbol periods for a normal cyclic prefix.

For asynchronous operation, each base station may independently maintain its frame timing and may autonomously assign indices to subframes. For example, base station 1 may have subframe $f_1$ starting at time $T_1$, base station 2 may have subframe $f_2$ starting at time $T_2$, etc., and base station L may have subframe $f_L$ starting at time $T_L$. The start times $T_1$, $T_2$, ..., and $T_L$ may not be time aligned, as shown in FIG. 2. Furthermore, subframe indices $f_1$, $f_2$, ..., and $f_L$ may have different values.

Wireless network 100 may utilize orthogonal frequency division multiplexing (OFDM) or single-carrier frequency division multiplexing (SC-FDM) for each of the downlink and uplink. For example, LTE utilizes OFDM on the downlink and SC-FDM on the uplink. OFDM and SC-FDM partition the system bandwidth into multiple (K) subcarriers, which may also be referred to as tones, bins, etc. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. The system bandwidth may also be partitioned into subbands, and each subband may cover a particular frequency range. For example, in LTE, each subband spans 1.08 MHz and includes 72 subcarriers.

The available time-frequency resources may be partitioned into resource blocks, which may also be referred to as tiles, etc. In general, each resource block may cover any time dimension and any frequency dimension. In LTE, each resource block covers 12 subcarriers in one slot and includes 84 resource elements for a normal cyclic prefix. In UMB, each resource block (or tile) covers 16 subcarriers in 8 symbol periods and includes 128 resource elements. Each resource element covers one subcarrier in one symbol period and may be used to send one modulation symbol. The number of available resource blocks may be dependent on the system bandwidth.

Referring back to FIG. 1, a terminal may be located anywhere within wireless network 100 and may observe high interference from some base stations. For example, terminal 120x may be located close to pico base station 110x but may observe high interference from macro base station 110b due to the higher transmit power level of base station 110b. As another example, terminal 120y may be located close to femto base station 110y but may be unable to access base station 110y due to restricted access. Terminal 120y may then communicate with base station 110c and may observe high interference from femto base station 110y. As yet another example, relay station 110z and terminal 120z in FIG. 1 may observe high interference in similar manner as pico base station 110x and terminal 120x. There may be other scenarios in which terminals can observe high interference from base stations.

In an aspect, a base station may send a low reuse preamble (LRP) on reserved frequency resources to allow terminals to detect the base station even in the presence of strong interfering base stations in an asynchronous wireless network. A low reuse preamble may also be referred to as a preamble, a pilot, a synchronization signal, etc. The low reuse preamble may allow terminals to detect and connect to a weaker base station, which may be desirable in certain scenarios as described below.

In one design, all base stations (e.g., including relay stations) may send low reuse preambles for use by terminals to detect the base stations. In another design, only designated base stations may send low reuse preambles. For example, the designated base stations may be base stations whose downlink transmissions might observe high interference from other base stations. As another example, the designated base stations may be low-power base stations, e.g., pico and femto base stations.

A base station may cover one or more cells. For example, a macro base station may cover three cells, a pico base station may cover one cell, a femto base station may cover one cell, and a relay base station may cover one cell. In one design, a base station may send a low reuse preamble for each cell covered by the base station. In another design, a base station may send a low reuse preamble for all cells covered by the base station.

In one design, some frequency resources may be reserved for sending low reuse preambles and may be referred to as preamble resources. The reserved frequency resources may be available all or most of the time for transmission of low reuse preambles. In one design, only low reuse preambles may be sent on the reserved frequency resources. In another design, low reuse preambles as well as other transmissions that do not cause high interference to the low reuse preambles may be sent on the reserved frequency resources. In yet another design, the reserved frequency resources may be cleared of other transmissions except for some symbol periods or time intervals in which other transmissions may be sent across all or most of the system bandwidth. For all designs, the reserved frequency resources may have low or no interference from transmissions of traffic data, control information, pilot, etc.

In one design, the reserved frequency resources may comprise a set of N subcarriers, where N may be any suitable value. The set may include contiguous subcarriers or subcarriers distributed across frequency. In general, any number of subcarriers and any one of the available subcarriers may be reserved for sending low reuse preambles. More reserved subcarriers may allow for transmission of more information in the low reuse preambles but may result in higher overhead. In one design, a set of 12 subcarriers may be reserved for sending low reuse preambles, which corresponds to the number of subcarriers for one resource block in LTE.

Figure 3A:
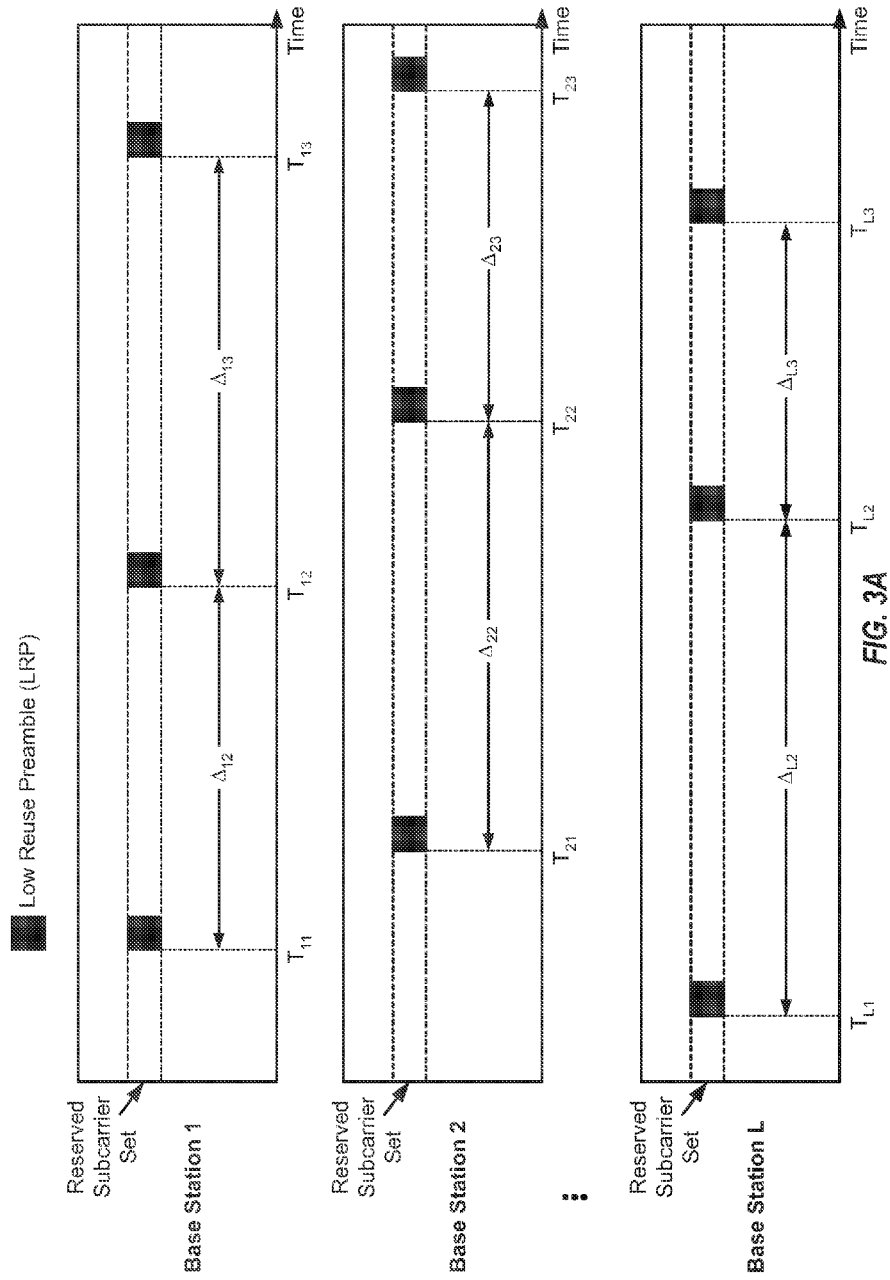
FIGS. 3A to 3C show transmission of low reuse preambles by asynchronous base stations on one subcarrier set and two subcarrier subsets.

FIG. 3A shows a design of sending low reuse preambles by multiple (L) base stations 1 through L with time reuse in an asynchronous wireless network. In this design, a set of N contiguous subcarriers (e.g., 12 subcarriers) may be reserved for sending low reuse preambles. In general, the reserved set of subcarriers may be located anywhere within the system bandwidth. All base stations may send their low reuse preambles on the same reserved set of subcarriers. A collision occurs when multiple base stations send their low reuse preambles on overlapping resources, e.g., on the same reserved subcarriers in overlapping time intervals. However, with time reuse, each base station may send its low reuse preamble in a small fraction of the time. This may then reduce the likelihood of collision between low reuse preambles from different base stations. This may also allow a terminal to detect a low reuse preamble from a weaker base station in the presence of high interference from a strong base station.

Each base station may send a low reuse preamble based on its frame timing. Different base stations may have different frame timing with asynchronous operation. In the example shown in FIG. 3A, base station 1 may send its low reuse preamble at time $T_{11}$, base station 2 may send its low reuse preamble at time $T_{21}$, and so on, and base station L may send its low reuse preamble at time $T_{L1}$. The low reuse preambles from the L base stations may or may not collide on the reserved subcarriers.

In one design, a given base station x may pseudo-randomly select the transmit times for its low reuse preamble in order to avoid continually colliding with a low reuse preamble from another base station. Base station x may vary the time interval between consecutive transmissions of its low reuse preamble. For example, base station x may send its low reuse preamble at time $T_{x1}$, and then again at time $T_{x2}$, where $T_{x2}=T_{x1}+\Delta_{x2}$, and then again at time $T_{x3}$, where $T_{x3}=T_{x2}+\Delta_{x3}$, and so on. Base station x may vary the time offsets $\Delta_{x2}$ and $\Delta_{x3}$ in order to reduce the likelihood of continual collision with another base station. Base station x may thus pseudo-randomly select the transmit times of its low reuse preamble by pseudo-randomly selecting the transmit time and/or by pseudo-randomly selecting the time offset between consecutive transmit times.

In the example shown in FIG. 3A, base station 1 may send its low reuse preamble at time $T_{11}$, then again at time $T_{12}=T_{11}+\Delta_{12}$, and then again at time $T_{13}=T_{12}+\Delta_{13}$ where transmit times $T_{11}$, $T_{12}$ and $T_{13}$ (or equivalently time offsets $\Delta_{12}$ and $\Delta_{13}$) may be pseudo-randomly selected. Base station 2 may send its low reuse preamble at time $T_{21}$, then again at time $T_{22}=T_2,+\Delta_{22}$ and then again at time $T_{23}=T_{22}+\Delta_{23}$, where transmit times $T_{21}$, $T_{22}$ and $T_{23}$ may be pseudo-randomly selected. Base station L may send its low reuse preamble at time $T_{L1}$, then again at time $T_{L2}=T_{L1}+\Delta_{L2}$, and then again at time $T_{L3}=T_{L2}+\Delta_{L3}$, where transmit times $T_{L1}$, $T_{L2}$ and $T_{L3}$ may be pseudo-randomly selected. Since different base stations send their low reuse preambles at different times, the likelihood of the low reuse preamble of a weaker base station colliding with the low reuse preamble of a strong base station may be small. A terminal may then be able to detect the low reuse preamble of the weaker base station with high probability.

Base station x may pseudo-randomly select the transmit times $T_{x1}$, $T_{x2}$, $T_{x3}$, etc., for its low reuse preamble in various manners. In one design, base station x may pseudo-randomly select the transmit times based on a pseudo-random function of a cell identity (ID), a base station ID, and/or other information. The transmit times may also be selected based on a function of the priority of the sender. For example, base stations with lower priority may send their low reuse preambles with larger time offsets. The transmit times of the low reuse preamble of base station x may be unknown to terminals, which may continually detect for low reuse preambles of different base stations when enabled.

Figure 3B:
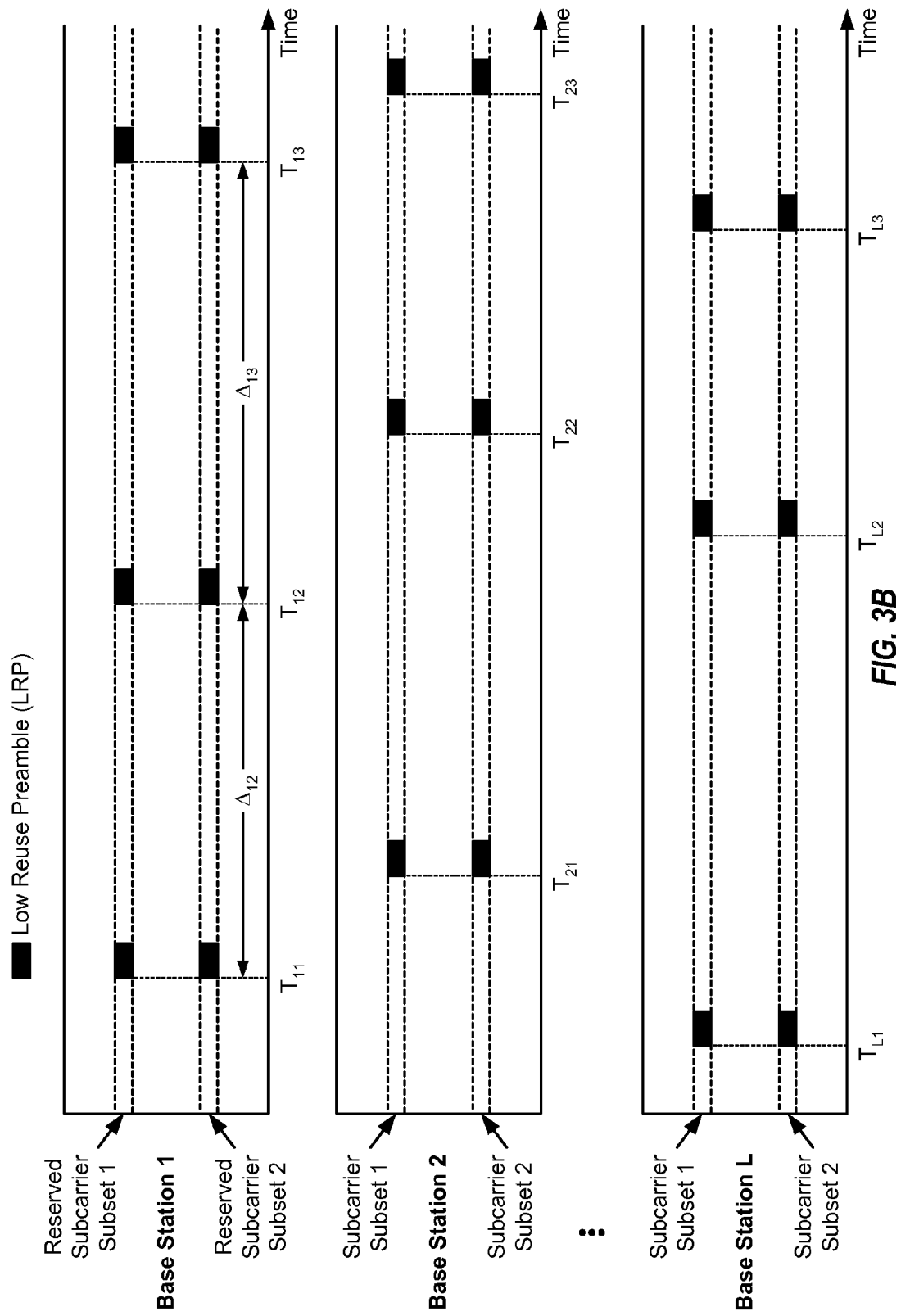

FIG. 3B shows a design of sending low reuse preambles by multiple base stations on distributed frequency resources with time reuse in an asynchronous wireless network. In this design, a set of subcarriers may be reserved for sending low reuse preambles and may comprise two subsets of contiguous subcarriers. For example, the reserved set may include 12 subcarriers, and each subset may include six contiguous subcarriers. In general, the two subsets of subcarriers may be located anywhere within the system bandwidth. All base stations may send their low reuse preambles on the same two subsets of subcarriers. In the design shown in FIG. 3B, each base station may send its low reuse preamble on the two subsets of subcarriers at pseudo-randomly selected times. A transmission of a low reuse preamble on a subset of subcarriers may be referred to as an LRP segment. The LRP segments on the two subcarrier subsets may or may not be aligned in time. For example, a base station may send one LRP segment on subcarrier subset 1 at time $T_1$, send another LRP segment on subcarrier subset 2 at time $T_2$, send another LRP segment in subcarrier subset 2 at time $T_3$, etc., where $T_1 < T_2 < T_3$. Different base stations may select different transmit times to reduce the likelihood of collision of their low reuse preambles, as described above for FIG. 3A.

In general, a set of subcarriers comprising any number of subsets may be reserved for transmission of low reuse preambles. The subsets may be distributed across frequency in any manner. The use of multiple subsets of subcarriers distributed in frequency may improve detection performance for low reuse preambles.

Figure 3C:
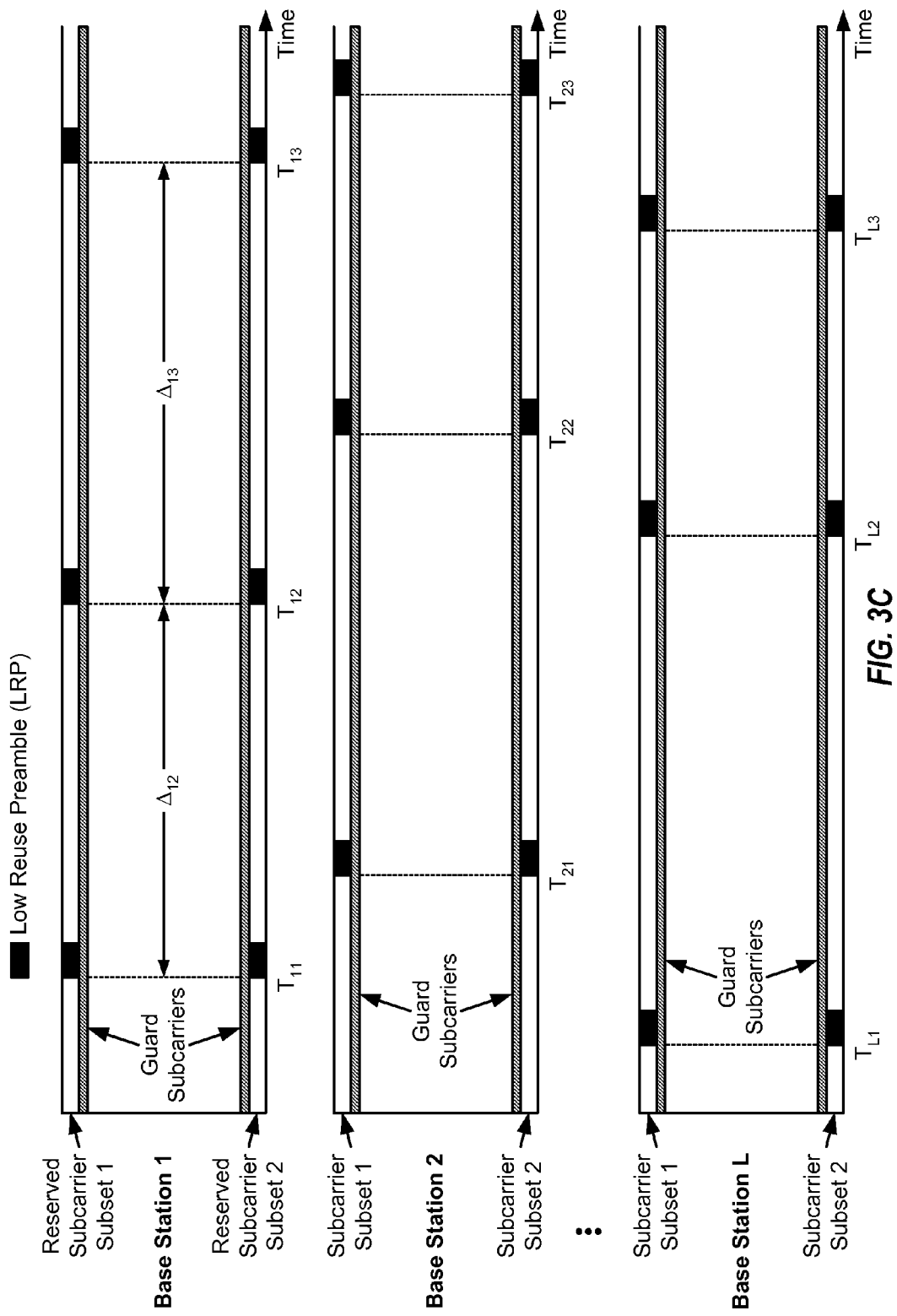

FIG. 3C shows another design of sending low reuse preambles on distributed frequency resources with time reuse. In this design, a reserved set of subcarriers may comprise two subsets of contiguous subcarriers, which may be located at the two edges of the system bandwidth. This design may avoid breakup of the system bandwidth to support low reuse preambles. All base stations may send their low reuse preambles on the same two subsets of subcarriers, as described above for FIG. 3B.

In one design, which is shown in FIG. 3C, guard subcarriers may be used to protect/isolate the reserved subcarriers used for low reuse preambles from non-reserved subcarriers used for reference signal, control information, traffic data, etc. For example, one guard subcarrier may be used to protect one subset of subcarriers located at one edge of the system bandwidth, and another guard subcarrier may be used to protect another subset of subcarriers located at the other edge of the system bandwidth, as shown in FIG. 3C. The guard subcarriers may protect the low reuse preambles from intercarrier interference (ICI) due to transmissions on the non-reserved subcarriers, which may improve detection performance for low reuse preambles.

In another aspect, different base stations may send low reuse preambles with a combination of time reuse and frequency reuse. Different frequency resources (e.g., different sets of subcarriers) may be reserved for sending low reuse preambles. Each base station may send its low reuse preamble on reserved frequency resources applicable for that base station. Different base stations may send their low reuse preambles on different reserved frequency resources, which may avoid collision. In one design, base stations of each power class may send low reuse preambles on a reserved set of subcarriers for that power class. For example, high-power base stations such as macro base stations may send their low reuse preambles on a first reserved set of subcarriers, and low-power base stations such as pico and femto base stations may send their low reuse preambles on a second reserved set of subcarriers.

Figure 4:
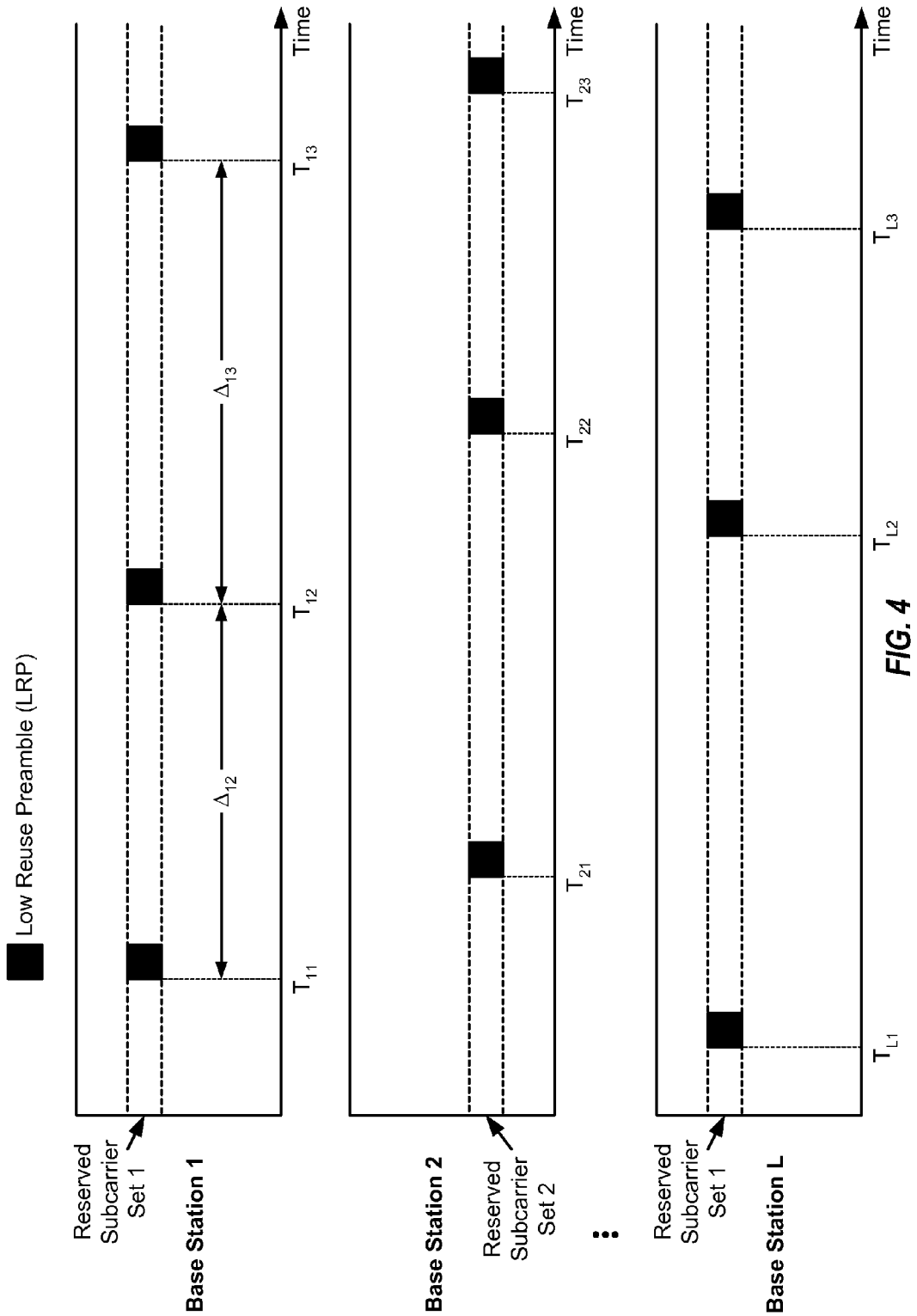
FIG. 4 shows transmission of low reuse preambles by asynchronous base stations with both time and frequency reuse.

FIG. 4 shows a design of sending low reuse preambles by multiple base stations with both time and frequency reuse in an asynchronous wireless network. In this design, two sets of subcarriers may be reserved for sending low reuse preambles. High-power base stations I and L may send their low reuse preambles on a first set of subcarriers. Low-power base station 2 may send its low reuse preamble on a second set of subcarriers. In the design shown in FIG. 4, each base station may send its low reuse preamble on the applicable set of subcarriers at pseudo-randomly selected times. Different base stations may use different sets of subcarriers and may also select different transmit times to reduce the likelihood of collision of their low reuse preambles.

In general, any number of sets of subcarriers may be reserved for transmission of low reuse preambles. Base stations may be assigned to the reserved sets of subcarriers in various manners, e.g., based on their power classes and/or other criteria. Sending low reuse preambles with frequency reuse in addition to time reuse may improve detection performance for low reuse preamble. Low reuse preambles may also be sent using only frequency reuse.

A low reuse preamble may be generated in various manners. In one design, a low reuse preamble may comprise a pilot portion and a data portion. The pilot portion may also be referred to as an acquisition signal, an acquisition channel, a reference portion, a preamble header, etc. The pilot portion may allow terminals to detect the low reuse preamble and may also be used for other purposes such as channel estimation. The data portion may carry information for the low reuse preamble and may also be referred to as a cell information channel, a preamble payload, etc.

Figure 5A:
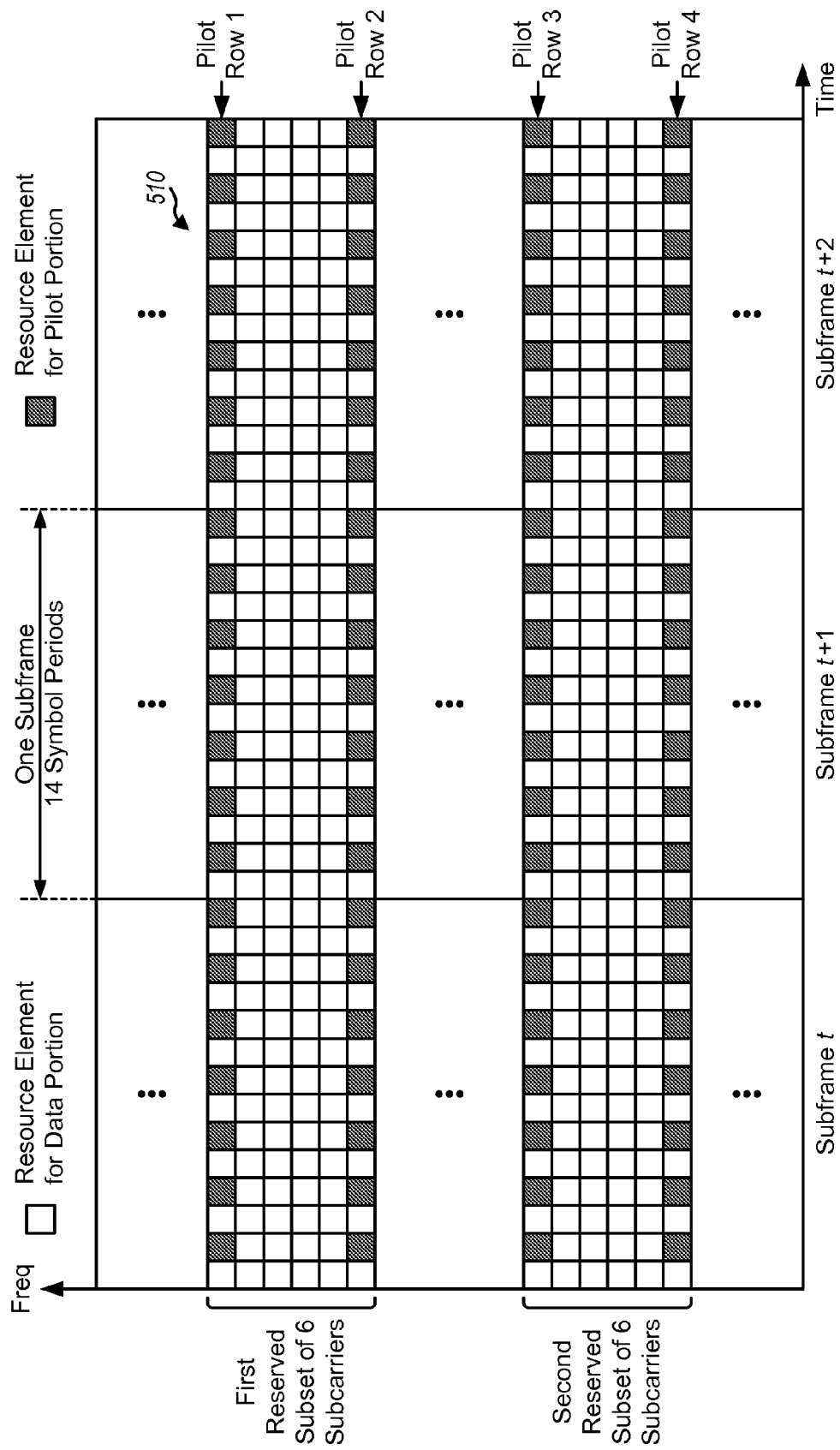

FIG. 5A shows a design of a low reuse preamble 510, which may be used for the transmission scheme shown in FIG. 3B or 3C. In this design, the low reuse preamble is sent on a reserved set of subcarriers comprising two subsets, with each subset including six contiguous subcarriers. The low reuse preamble is also sent in three consecutive subframes, with each subframe including 14 symbol periods for the normal cyclic prefix (as shown in FIG. 5A) or 12 symbol periods for the extended cyclic prefix (not shown in FIG. 5A). The top half of the low reuse preamble is sent in a first block covering six subcarriers in three subframes. The bottom half of the low reuse preamble is sent in a second block covering six subcarriers in three subframes.

In the design shown in FIG. 5A, the low reuse preamble comprises a pilot portion and a data portion. The pilot portion occupies every other resource elements in the topmost and bottommost rows of the first block and also every other resource elements in the topmost and bottommost rows of the second block. The data portion occupies the remaining resource elements in the first and second blocks. Each row in which the pilot portion is sent is referred to as a pilot row. In the example shown in FIG. 5A, there are four pilot rows, and each pilot row includes 21 resource elements for the pilot portion. The resource elements used for the pilot portion are referred to as pilot resource elements. The resource elements used for the data portion are referred to as data resource elements. In general, the pilot portion may be sent in M pilot rows, where M≧1, and may be sent on N resource elements in each pilot row, where N>1.

Known symbols may be sent on pilot resource elements and may be referred to as pilot symbols. The pilot symbols may be used for preamble detection, channel estimation, etc. In one design, the pilot symbols may be generated by scrambling a sequence of known modulation symbols with a scrambling sequence, which may be common to all cells or base stations. The scrambling sequence may be a pseudo-random number (PN) sequence or some other sequences having desirable properties. In another design, the pilot symbols may be generated based on a discrete Fourier matrix (DFT).

In yet another design, the pilot symbols may be generated based on a CAZAC (constant amplitude zero auto correlation) sequence. A CAZAC sequence can provide zero auto-correlation, which is a large value for correlation of the CAZAC sequence with itself at zero offset and zero values for all other offsets. The zero auto-correlation property is beneficial for accurate detection of the CAZAC sequence. Some example CAZAC sequences include a Zadoff-Chu sequence, a Chu sequence, a Frank sequence, a generalized chirp-like (GCL) sequence, etc.

In one design, the pilot symbols for each pilot row may be generated based on the Zadoff-Chu sequence, as follows:

$$S_m(n) = \begin{cases} e^{-j\frac{\pi r_m n^2}{N}} & \text{for even } N \\ e^{-j\frac{\pi r_m n(n+1)}{N}} & \text{for odd } N \end{cases} \quad \text{Eq (1)}$$

for $n = 0, \ldots, N-1$ and $m = 1, \ldots, M$, where

M is the number of pilot rows, e.g., M=4 for the example in FIG. 5A,

N is the number of pilot symbols in each pilot row, e.g., N=21 in FIG. 5A, $r_m$ is a parameter of the Zadoff-Chu sequence, and $S_m(n)$ is the n-th pilot symbol in a pilot symbol sequence for the m-th pilot row.

The sequence parameter $r_m$ may be a positive integer value that may be co-prime to N, so that the greatest common factor of $r_m$ and N is one. For example, $r_m$ may be equal to 2, 4, 5, 8, 10, 11, 13, 16, 17, 19 or 20 for the case in which N=21.

One pilot symbol sequence comprising N pilot symbols may be generated based on a distinct integer value of $r_m$. M different pilot symbol sequences may be generated with M different integer values of $r_m$ for the M pilot rows. The N pilot symbols in each pilot symbol sequence may be sent on the N pilot resource elements in the corresponding pilot row. As an example, for pilot row 1 in FIG. 5A, pilot symbol $S_1(0)$ may be sent in the leftmost pilot resource element in the row, pilot symbol $S_1(1)$ may be sent in the second leftmost pilot resource element in the row, and so on, and pilot symbol $S_1(20)$ may be sent in the rightmost pilot resource element in the row.

The use of the Zadoff-Chu sequence for the pilot portion may provide lower false alarm probability than other sequences such as random-phase sequences and DFT sequences. The lower false alarm probability may be due to the good linear autocorrelation property of the Zadoff-Chu sequence. Using Zadoff-Chu sequences generated with different values of $r_m$ for different pilot rows may provide lower false alarm probability than using the same Zadoff-Chu sequence for different pilot rows or the same Zadoff-Chu sequence but with different cyclic shifts for different pilot rows. In addition, the constant amplitude/modulus property of the Zadoff-Chu sequence may result in better performance for channel estimation.

Figure 5B:
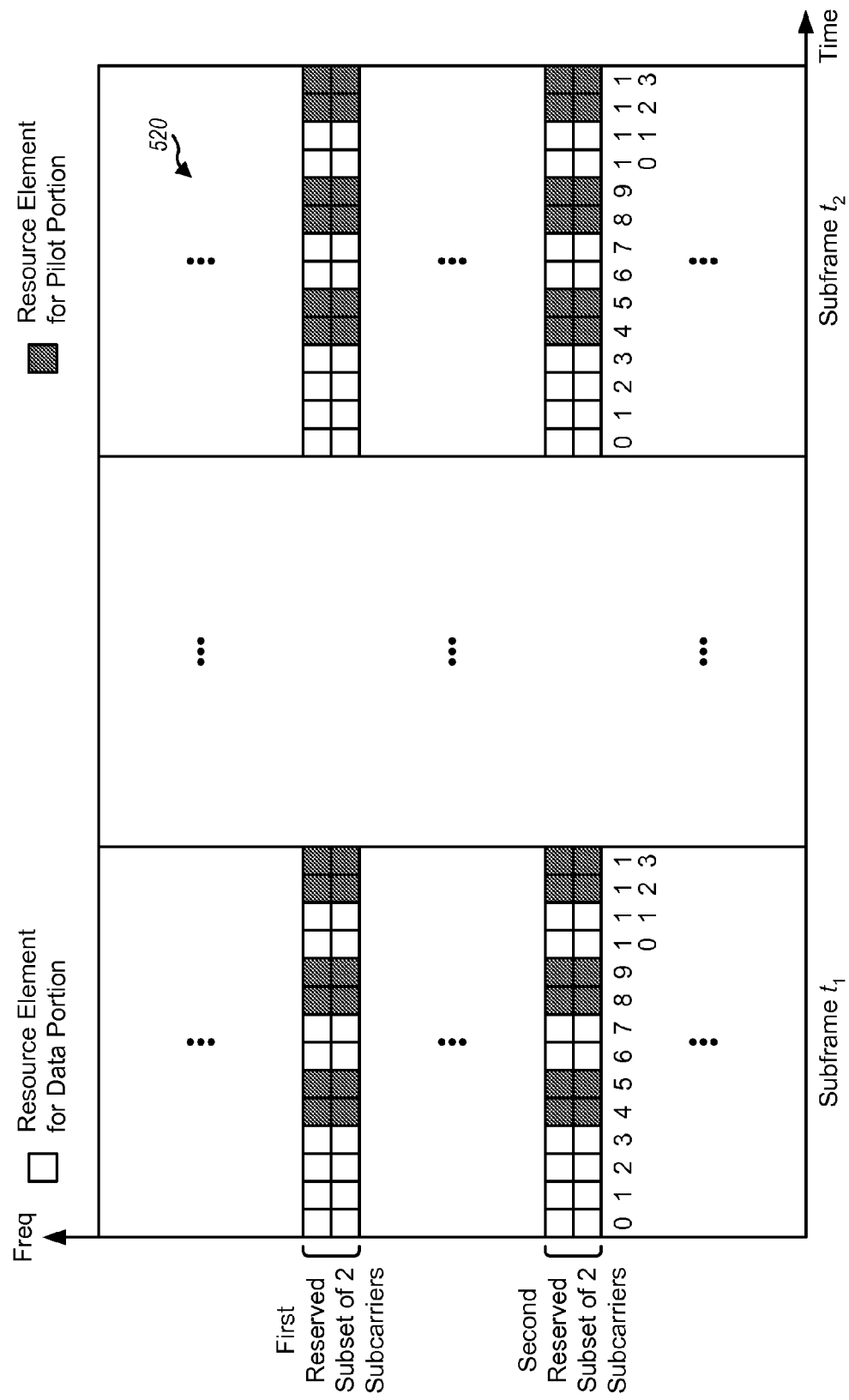

FIG. 5B shows a design of a low reuse preamble 520, which may be used for the transmission scheme shown in FIG. 3B or 3C. In this design, the low reuse preamble is sent on a reserved set of subcarriers comprising two subsets, with each subset including two contiguous subcarriers. The low reuse preamble is also sent in two non-consecutive subframes. Each subframe may include 14 symbol periods with indices of 0 through 13. In one design, the pilot portion of the low reuse preamble may be sent in symbol periods that are not used for a reference signal or control information by neighbor base stations. For example, in LTE, a base station may send a reference signal from two antennas in symbol period 0, 4, 7 and 11 or from four antennas in symbol periods 0, 1, 4, 7, 8 and 11 of each subframe. The base station may also send control information in symbol periods 0, 1 and 2 of each subframe. Improved detection performance for the low reuse preamble may be achieved by sending the pilot portion to avoid the reference signal and the control information from neighbor base stations.

FIG. 5C shows a design of a low reuse preamble 530, which may be used for the transmission scheme shown in FIG. 3A or 4. In this design, the low reuse preamble is sent on a reserved set of 12 contiguous subcarriers. The low reuse preamble is also sent in one subframe of 14 symbol periods. The low reuse preamble is thus sent in a block covering 12 subcarriers in one subframe.

In the design shown in FIG. 5C, the low reuse preamble comprises a pilot portion and a data portion. The pilot portion occupies M=4 pilot rows, which are the second, fifth, eight, and eleventh rows of the block. The pilot portion occupies N=14 resource elements in each pilot row. A pilot symbol sequence comprising 14 pilot symbols may be generated (e.g., as shown in equation (1)) for each pilot row and may be mapped to the 14 resource elements in the row.

FIG. 5D shows a design of a wideband low reuse preamble 540, which may be sent on all or most of the usable subcarriers in one symbol period (as shown in FIG. 5D) or in multiple symbol periods (not shown in FIG. 5D). The pilot portion may be sent in every P-th subcarriers, where P>1 in general and P=3 in the design shown in FIG. 5D. The data portion may be sent in the remaining subcarriers. The wideband low reuse preamble may be used in a synchronous wireless network. In one design, each base station may be assigned specific symbol periods in which to send its wideband low reuse preamble. In another design, each base station may pseudo-randomly select the symbol periods in which to send its wideband low reuse preamble.

FIGS. 5A to 5D show several exemplary designs of a low reuse preamble. In general, a low reuse preamble may be sent in a block of any suitable frequency dimension and any suitable time dimension. The block may include contiguous resource elements (e.g., as shown in FIG. 5C) or non-contiguous resource elements (e.g., as shown in FIG. 5A). A subset of the available resource elements may be used for the pilot portion, and remaining resource elements may be used for the data portion. The pilot resource elements may be distributed, e.g., as shown FIGS. 5A to 5D, or may be placed at other locations within the block. The low reuse preamble designs described herein may be used for subframes with the normal cyclic prefix, subframes with the extended cyclic prefix, regular subframes, MBSFN subframes, etc. The low reuse preamble may also be used for time division duplexing (TDD), frequency division duplexing (FDD), etc.

In one design, the low reuse preambles from different base stations may include the same pilot portion but different data portions. In this design, different base stations may be detected based on the common pilot portion but may be identified based on information in the data portion of their low reuse preambles. In another design, the low reuse preambles from different base stations may include different pilot portions as well as different data portions.

The data portion of a low reuse preamble from a base station may include various types of information. In one design, the data portion may include one or more of the following:

Cell ID or base station ID,
Cell information,
Resource reservation status and requests, and
Cyclic redundancy check (CRC).

The cell ID or base station ID may be used by terminals to identify a cell or a base station sending the low reuse preamble. The base station may cover one or more cells. The low reuse preamble may be for a specific cell and may then include a cell ID for that cell. The low reuse preamble may also be for all cells of the base station and may then include a base station ID. The cell ID may be a global cell ID that may be unique over a larger geographic area and may include more bits. The cell ID may also be a physical cell ID that may be unique over a smaller geographic area and may include fewer bits.

The cell information may comprise various types of information for the cell or base station sending the low reuse preamble. For example, the cell information may include advertised data rate and/or quality-of-service (QoS) supported by the cell or base station. QoS may be quantified by a certain guaranteed delay, a certain guaranteed data rate, a certain expected data rate, etc. The cell information may also include information for the system bandwidth, the transmit power of the base station, etc. The cell information may also include other information that may be pertinent to the terminals, e.g., information for location determination.

The resource reservation status may include information on time and/or frequency resources that the cell or base station has reserved for other base stations for sending control information and/or traffic data. The resource reservation requests may include indications on whether to reduce interference on reserved time and/or frequency resources for control information and/or traffic data.

The CRC may be used by terminals to determine whether the data portion of the low reuse preamble has been decoded correctly. The CRC may include a sufficient number of bits to obtain the desired false alarm probability.

The information for the data portion may be processed and sent in various manners. In one design, the information may be processed based on a modulation and coding scheme (MCS) selected to obtain the desired coverage for the low reuse preamble. In one design, the information may be processed in accordance with a rate 1/5 convolutional code and BPSK. In another design, the information may be processed in accordance with a rate 1/3 convolutional code and QPSK. The information may also be encoded with other code rates, other forward error correction (FEC) codes, and/or other modulation schemes. The amount of information in the data portion may be dependent on the selected modulation and coding scheme and the number of resource elements available for the data portion.

In another design, the information for the data portion may be sent in a beacon signal. A beacon signal is a signal in which information is conveyed in the specific subcarriers used for the signal instead of in the modulation symbols sent on the subcarriers. The beacon signal may occupy one or few subcarriers in each beacon symbol period, which is a symbol period in which the beacon signal is sent. A base station may generate a message comprising information for the data portion. The base station may encode the message with a beacon code to determine the specific subcarrier(s) to use for the beacon signal in each beacon symbol period. The beacon code may be such that the low reuse preamble can be detected by a terminal without knowledge of the frame timing of the base station. This may be achieved by ensuring that all shifts of a given codeword map to the same message.

A terminal may detect for low reuse preambles from base stations in various manners, e.g., using coherent or non-coherent correlation. In one design, the terminal may correlate received symbols with locally generated pilot symbols to detect for low reuse preambles. In each symbol period, the terminal may perform OFDM or SC-FDM demodulation and obtain K received symbols for the K total subcarriers. The terminal may extract M received symbols from the M resource elements used for the pilot portion.

In one design, in each symbol period, the terminal may correlate the N most recent received symbols for each pilot row with N locally generated pilot symbols for that pilot row, as follows:

$$C_m(t) = \sum_{n=0}^{N-1} S_m^*(n) \cdot R_m(t - t_n) \text{ for } m = 1, \ldots, M, \quad \text{Eq (2)}$$

where $R_m(t-t_n)$ is a received symbol corresponding to the n-th pilot symbol in the m-th pilot row in symbol period t, $C_m(t)$ is a correlation result for the m-th pilot row in symbol period t, and "*" denotes a complex conjugate.

A correlation metric Q(t) may be defined as follows:

$$Q(t) = \sum_{m=1}^{M} |C_m(t)|^2. \quad \text{Eq (3)}$$

If the terminal is equipped with multiple receive antennas, then the terminal may perform correlation for each pilot row of each antenna. The terminal may then combine the correlation results for all pilot rows of all receive antennas to obtain the correlation metric. The terminal may also implement other receiver processing techniques (e.g., minimum mean square error (MMSE), maximum likelihood (ML), or subspace-based techniques) for pilot detection.

The terminal may declare the presence of a low reuse preamble if the correlation metric exceeds a threshold. In one design, the threshold may be a fixed value, which may be selected to obtain the desired detection probability and false alarm probability. In another design, the threshold may be a configurable value, which may be determined based on estimated noise and interference on the reserved set of subcarriers, e.g., during quiet periods when low reuse preambles are not detected.

The terminal may detect for the presence of a low reuse preamble in each symbol period, e.g., as described above. Upon detecting a low reuse preamble, the terminal may derive a channel estimate based on the pilot portion of the detected low reuse preamble. In one design, a channel gain may be estimated for each pilot resource element, as follows:

$$G_m(t) = \frac{R_m(t)}{S_m(t)} \text{ for } m = 1, \ldots, M, \quad \text{Eq (4)}$$

where $R_m(t)$ is a received pilot symbol for the m-th pilot row in symbol period t, $S_m(t)$ is a transmitted pilot symbol for the m-th pilot row in symbol period t, and $G_m(t)$ is a channel gain estimate for the m-th pilot row in symbol period t.

The channel gain estimates for the pilot resource elements may be used to derive channel gain estimates for data resource elements, e.g., using a least square estimation technique, an MMSE technique, etc. The channel gain estimates for the data resource elements may be used for coherent detection and/or decoding of received symbols from the data resource elements to recover the information sent in the data portion.

The terminal may detect for low reuse preambles from different base stations and may obtain information for the detected base stations. In one design, the terminal may send information for detected base stations to a serving base station. The serving base station may decide to hand the terminal over to a weaker base station and may reserve some frequency resources (e.g., one or more subbands) to allow the terminal to communicate with the weaker base station. The serving base station may also reduce transmit power on some frequency resources to allow the terminal to detect a control channel (e.g., carrying a larger preamble) from the weaker base station.

The low reuse preambles described herein may allow terminals to detect weaker base stations in the presence of high interference from strong base stations. This may be beneficial in range extension scenarios and restricted association scenarios. In a range extension scenario, a terminal (terminal 120x in FIG. 1) may connect to a weaker base station (e.g., base station 110x) with lower pathloss and lower geometry instead of a strong base station (e.g., base station 110b) with higher geometry but higher pathloss. This may be desirable to reduce interference to the wireless network to achieve a given data rate for the terminal. In a restricted association scenario, a terminal (terminal 120y in FIG. 1) may be unable to access a strong base station (e.g., base station 110y) due to restricted access and may then connect to a weaker base station (e.g., base station 110c) with unrestricted access but lower geometry.

The terminals in both the range extension and restricted association scenarios may observe high interference from strong base stations. These terminals may still be able to detect the low reuse preambles from weaker base stations in the presence of high interference from strong base stations. The weaker base stations may have much lower transmit power level and/or larger pathloss whereas the strong base stations may have much higher transmit power level and/or lower pathloss. The low reuse preambles may thus be especially beneficial when the desired base stations are weaker than the interfering base stations.

The low reuse preambles may be sent by base stations in addition to other pilots and/or preambles. For example, in LTE, a base station (or an eNB) may send a low reuse preamble in addition to a cell-specific reference signal, a primary synchronization signal, a secondary synchronization signal, control information, etc. It may be beneficial to configure a subframe as an MBSFN subframe when sending a low reuse preamble so that no reference signals are transmitted in the data portion of the subframe. In UMB, a base station may send a low reuse preamble in addition to a superframe preamble, time division multiplexed (TDM) pilots, a common pilot, etc. A terminal may also send a low reuse preamble to allow base stations and/or other terminals to detect the terminal.

FIG. 6 shows a design of a process 600 for sending a low reuse preamble in a wireless network. Process 600 may be performed by a base station (as described below) or by some other entity. The base station may generate a low reuse preamble comprising a pilot portion and a data portion (block 612). The pilot portion may comprise pilot symbols used for detection of the low reuse preamble. The data portion may comprise information for the base station. The base station may determine frequency resources reserved for sending low reuse preambles by base stations, e.g., asynchronous base stations (block 614). The base station may then send the low reuse preamble on the reserved frequency resources (block 616).

In one design of block 612, the base station may generate pilot symbols for the pilot portion based on a pseudo-random scrambling sequence or a CAZAC sequence such as a Zadoff-Chu sequence. In one design, the base station may generate multiple sequences of pilot symbols based on the Zadoff-Chu sequence with different parameter values, e.g., as shown in equation (1). The base station may map each sequence of pilot symbols to a different row of resource elements used for the pilot portion. In one design, the base station may generate the data portion to include a cell ID, a base station ID, cell information, resource reservation status and requests, a CRC, and/or other information. The low reuse preamble may also include other portion for other types of information.

In one design, the low reuse preambles for different base stations may comprise a pilot portion that is common for all base stations and a data portion that is different for each base station. In another design, the low reuse preambles for different base stations may comprise different pilot portions as well as different data portions. For example, the pilot portion of the low reuse preamble from each base station may include the cell ID or the base station ID for that base station.

In one design, the base station may pseudo-randomly select a time to send the low reuse preamble, e.g., based on a function of the cell ID or the base station ID for the base station. The base station may then send the low reuse preamble on the reserved frequency resources at the selected time. Different base stations may pseudo-randomly select different times to send their low reuse preambles.

In one design, the reserved frequency resources may comprise a set of subcarriers. In one design, the set of subcarriers may comprise multiple subsets, with each subset including at least one contiguous subcarrier, e.g., as shown in FIGS. 3B, 3C 5A and 5B. The base station may send the low reuse preamble on the reserved set of subcarriers.

In one design, the same frequency resources may be used by all base stations to send their low reuse preambles. In another design, different frequency resources may be reserved for sending low reuse preambles by different types of base stations, e.g., base stations in different power classes. The base station may then send the low reuse preamble on the reserved frequency resources applicable for the type of the first base station.

FIG. 7 shows a design of an apparatus 700 for sending a low reuse preamble in a wireless network. Apparatus 700 includes a module 712 to generate a low reuse preamble comprising a pilot portion and a data portion, a module 714 to determine frequency resources reserved for sending low reuse preambles, and a module 716 to send the low reuse preamble on the reserved frequency resources from a base station.

In another design for sending low reuse preambles in a wireless network, a base station may generate a low reuse preamble comprising a pilot portion and a data portion. The pilot portion may comprise pilot symbols used for detection of the low reuse preamble, may be common for all base stations, and may be generated as described above. The data portion may comprise data symbols for information for the base station and may be different for different base stations. The base station may generate at least one OFDM symbol comprising the pilot symbols on first subcarriers and the data symbols on second subcarriers. The first and second subcarriers may be distributed across system bandwidth.

The base station may then send the at least one OFDM symbol for the low reuse preamble in at least one symbol period. In one design, the at least one symbol period may be pseudo-randomly selected by the base station. In another design, the at least one symbol period may be assigned to the base station for sending the low reuse preamble. In yet another design, at least one symbol period not used by neighbor base stations to send reference signals or control information may be selected by the base station for sending the low reuse preamble. The base station may also determine the at least one symbol period for the at least one OFDM symbol in other manners.

FIG. 8 shows a design of a process 800 for receiving low reuse preambles in a wireless network. Process 800 may be performed by a terminal (as described below) or by some other entity (e.g., a relay station). The terminal may determine frequency resources reserved for sending low reuse preambles (block 812). The terminal may detect for low reuse preambles sent by base station (e.g., asynchronous base stations) on the reserved frequency resources (block 814). If a low reuse preamble is detected, then the terminal may recover information for a base station from the detected low reuse preamble (block 816).

In one design of block 814, the terminal may generate pilot symbols for a pilot portion of a low reuse preamble, e.g., based on a Zadoff-Chu sequence as shown in equation (1). The terminal may correlate received symbols from the reserved frequency resources with the pilot symbols, e.g., as shown in equation (2). The terminal may determine whether a low reuse preamble is detected based on correlation results.

In one design of block 816, the terminal may derive a channel estimate based on the pilot portion of the detected low reuse preamble. The terminal may then recover a data portion of the detected low reuse preamble based on the channel estimate. The terminal may obtain a cell ID, a base station ID, cell information, resource reservation status and requests, and/or other information from the data portion. The terminal may also determine whether the low reuse preamble is decoded correctly based on a CRC included in the low reuse preamble.

In one design, the reserved frequency resources may comprise a set of subcarriers. The terminal may then detect for low reuse preambles sent on the set of subcarriers. In one design, different frequency resources may be reserved for sending low reuse preambles by different types of base stations. The terminal may then detect for low reuse preambles sent by each type of base stations from the frequency resources reserved for that type of base stations.

FIG. 9 shows a design of an apparatus 900 for receiving low reuse preambles in a wireless network. Apparatus 900 includes a module 912 to determine frequency resources reserved for sending low reuse preambles, a module 914 to detect for low reuse preambles sent by base stations (e.g., asynchronous base stations) on the reserved frequency resources, and a module 916 to recover information for a base station from a detected low reuse preamble.

The modules in FIGS. 7 and 9 may comprise processors, electronics devices, hardware devices, electronics components, logical circuits, memories, software codes, firmware codes, etc., or any combination thereof.

Figure 10:
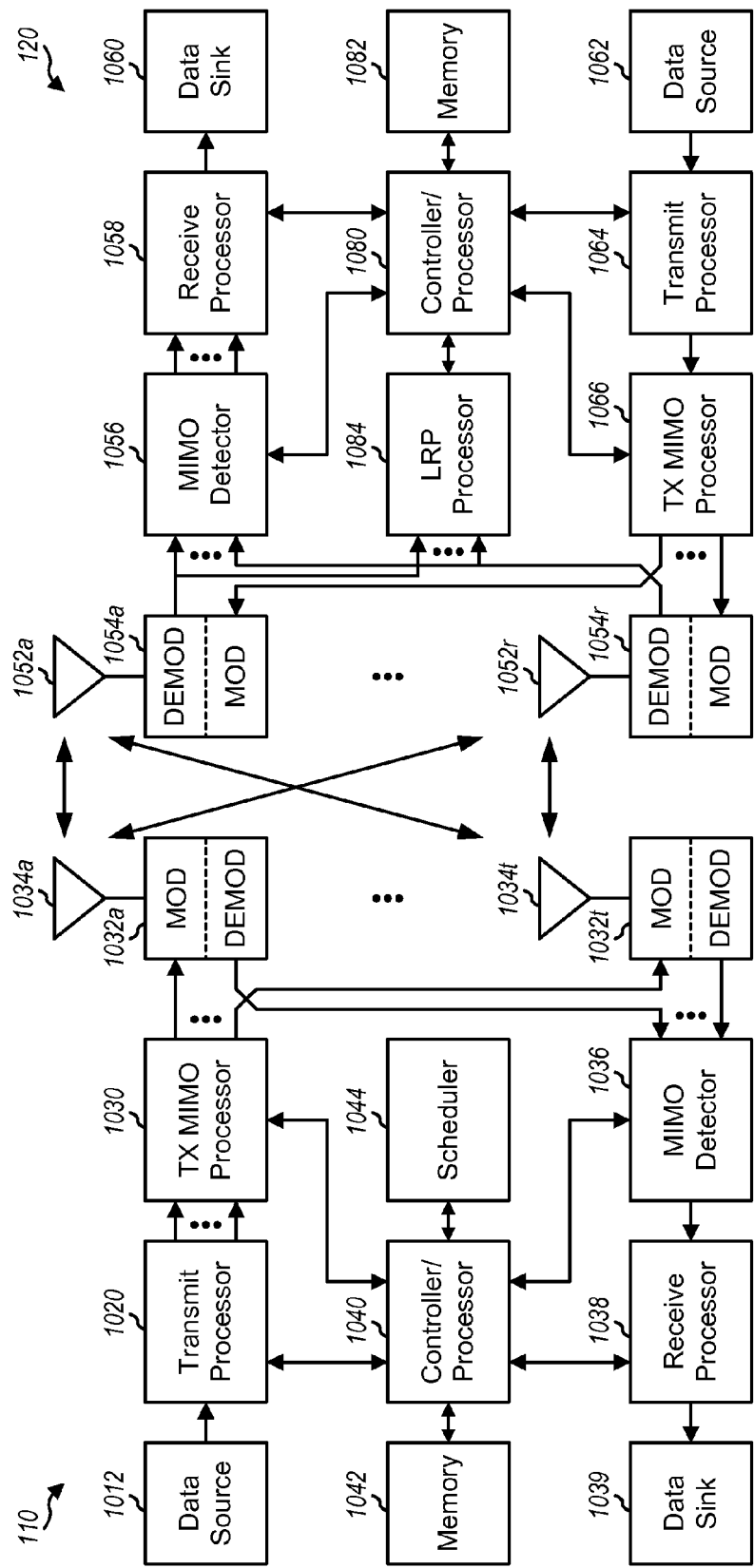
FIG. 10 shows a block diagram of a base station and a terminal.

FIG. 10 shows a block diagram of a design of a base station 110 and a terminal 120, which may be one of the base stations and one of the terminals in FIG. 1. Base station 110 may be equipped with T antennas 1034a through 1034t, and terminal 120 may be equipped with R antennas 1052a through 1052r, where in general T≧1 and R≧1.

At base station 110, a transmit processor 1020 may receive traffic data from a data source 1012 and messages from a controller/processor 1040. Transmit processor 1020 may process (e.g., encode, interleave, and modulate) the traffic data and messages and provide data symbols and control symbols, respectively. Transmit processor 1020 may also generate pilot symbols and data symbols for a low reuse preamble and pilot symbols for other pilots and/or reference signals. A transmit (TX) multiple-input multiple-output (MIMO) processor 1030 may perform spatial processing (e.g., preceding) on the data symbols, the control symbols, and/or the pilot symbols, if applicable, and may provide T output symbol streams to T modulators (MODs) 1032a through 1032t. Each modulator 1032 may process a respective output symbol stream (e.g., for OFDM, SC-FDM, etc.) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At terminal 120, antennas 1052a through 1052r may receive the downlink signals from base station 110 and may provide received signals to demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for OFDM, SC-FDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded traffic data for terminal 120 to a data sink 1060, and provide decoded messages to a controller/processor 1080. A low reuse preamble (LRP) processor 1084 may detect for low reuse preambles from base stations and provide information for detected base stations or cells to controller/processor 1080.

On the uplink, at terminal 120, a transmit processor 1064 may receive and process traffic data from a data source 1062 and messages from controller/processor 1080. The symbols from transmit processor 1064 may be precoded by a TX MIMO processor 1066 if applicable, further processed by modulators 1054a through 1054r, and transmitted to base station 110. At base station 110, the uplink signals from terminal 120 may be received by antennas 1034, processed by demodulators 1032, detected by a MIMO detector 1036 if applicable, and further processed by a receive processor 1038 to obtain the decoded packets and messages transmitted by terminal 120.

Controllers/processors 1040 and 1080 may direct the operation at base station 110 and terminal 120, respectively. Processor 1040 and/or other processors and modules at base station 110 may perform or direct process 600 in FIG. 6 and/or other processes for the techniques described herein. Processor 1084 and/or other processors and modules at terminal 120 may perform or direct process 800 in FIG. 8 and/or other processes for the techniques described herein. Memories 1042 and 1082 may store data and program codes for base station 110 and terminal 120, respectively. A scheduler 1044 may schedule terminals for data transmission on the downlink and/or uplink and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whatever such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining frequency resources reserved for sending low reuse preambles, wherein the reserved frequency resources comprise a set of subcarriers;
   sending a low reuse preamble on the set of subcarriers of the reserved frequency resources from a base station;
   using at least one guard subcarrier to isolate the set of subcarriers from remaining subcarriers; and
   sending no transmissions on the at least one guard subcarrier.

2. The method of claim 1, wherein the base station is asynchronous with at least one other base station.

3. The method of claim 1, further comprising:
   generating the low reuse preamble comprising a pilot portion and a data portion, the pilot portion comprising pilot symbols used for detection of the low reuse preamble, and the data portion comprising information for the base station.

4. A method for wireless communication, comprising:
   determining frequency resources reserved for sending low reuse preambles;
   sending a low reuse preamble on the reserved frequency resources from a base station;
   generating the low reuse preamble comprising a pilot portion and a data portion, the pilot portion comprising pilot symbols used for detection of the low reuse preamble, and the data portion comprising information for the base station; and
   generating the pilot symbols for the pilot portion based on a pseudo-random scrambling sequence or a CAZAC (constant amplitude zero auto correlation) sequence.

5. A method for wireless communication, comprising:
   determining frequency resources reserved for sending low reuse preambles;
   sending a low reuse preamble on the reserved frequency resources from a base station;
   generating the low reuse preamble comprising a pilot portion and a data portion, the pilot portion comprising pilot symbols used for detection of the low reuse preamble, and the data portion comprising information for the base station; and generating the pilot symbols for the pilot portion based on a Zadoff-Chu sequence.

6. A method for wireless communication, comprising:
determining frequency resources reserved for sending low reuse preambles;
sending a low reuse preamble on the reserved frequency resources from a base station;
generating the low reuse preamble comprising a pilot portion and a data portion, the pilot portion comprising pilot symbols used for detection of the low reuse preamble, and the data portion comprising information for the base station;
generating multiple sequences of pilot symbols based on a Zadoff-Chu sequence with different parameter values; and
mapping each of the multiple sequences of pilot symbols to one of multiple rows of resource elements used for the pilot portion.

7. The method of claim 3, further comprising:
generating the data portion to include at least one of a cell identity (ID), a base station ID, cell information, resource reservation status and requests, and a cyclic redundancy check (CRC).

8. The method of claim 1, wherein low reuse preambles for the base station and at least one other base station comprise a pilot portion common for all base stations and a data portion different for each base station.

9. The method of claim 1, wherein the sending the low reuse preamble comprises
pseudo-randomly selecting a time to send the low reuse preamble, and
sending the low reuse preamble on the reserved frequency resources at the selected time.

10. The method of claim 9, wherein the pseudo-randomly selecting the time to send the low reuse preamble comprises pseudo-randomly selecting the time to send the low reuse preamble based on a function of a cell identity (ID) or a base station ID for the base station.

11. The method of claim 1, wherein the set of subcarriers comprises multiple subsets, each subset including at least one contiguous subcarrier.

12. The method of claim 1, wherein different frequency resources are reserved for sending low reuse preambles by different types of base stations, and wherein the sending the low reuse preamble comprises sending the low reuse preamble on the reserved frequency resources applicable for a type of the base station.

13. An apparatus for wireless communication, comprising:
means for determining frequency resources reserved for sending low reuse preambles;
means for sending a low reuse preamble on the reserved frequency resources from a base station;
means for generating the low reuse preamble comprising a pilot portion and a data portion, the pilot portion comprising pilot symbols used for detection of the low reuse preamble, and the data portion comprising information for the base station;
means for generating multiple sequences of pilot symbols based on a Zadoff-Chu sequence; and
means for mapping the multiple sequences of pilot symbols to multiple rows of resource elements used for the pilot portion.

14. The apparatus of claim 13, further comprising:
means for generating the data portion to include at least one of a cell identity (ID), a base station ID, cell information, resource reservation status and requests, and a cyclic redundancy check (CRC).

15. The apparatus of claim 13, wherein the means for sending the low reuse preamble comprises
means for pseudo-randomly selecting a time to send the low reuse preamble, and
means for sending the low reuse preamble on the reserved frequency resources at the selected time.

16. An apparatus for wireless communication, comprising:
at least one processor configured to:
determine frequency resources reserved for sending low reuse preambles,
send a low reuse preamble on the reserved frequency resources from a base station,
generate the low reuse preamble comprising a pilot portion and a data portion, the pilot portion comprising pilot symbols used for detection of the low reuse preamble, and the data portion comprising information for the base station,
generate multiple sequences of pilot symbols based on a Zadoff-Chu sequence, and
map the multiple sequences of pilot symbols to multiple rows of resource elements used for the pilot portion.

17. The apparatus of claim 16, wherein the at least one processor is configured to generate the data portion to include at least one of a cell identity (ID), a base station ID, cell information, resource reservation status and requests, and a cyclic redundancy check (CRC).

18. The apparatus of claim 16, wherein the at least one processor is configured to pseudo-randomly select a time to send the low reuse preamble and to send the low reuse preamble on the reserved frequency resources at the selected time.

19. A computer program product, comprising:
a non-transitory computer-readable medium comprising:
code for causing at least one computer to determine frequency resources reserved for sending low reuse preambles, wherein the reserved frequency resources comprise a set of subcarriers,
code for causing the at least one computer to send a low reuse preamble on the set of subcarriers of the reserved frequency resources from a base station,
code for causing the at least one computer to use at least one guard subcarrier to isolate the set of subcarriers from remaining subcarriers, and
code for causing the at least one computer to not send transmissions on the at least one guard subcarrier.

20. A method for wireless communication, comprising:
generating a low reuse preamble comprising a pilot portion and a data portion, the pilot portion comprising pilot symbols used for detection of the low reuse preamble, and the data portion comprising data symbols for information for a base station;
generating at least one orthogonal frequency division multiplexing (OFDM) symbol comprising the pilot symbols on first subcarriers and the data symbols on second subcarriers, the first and second subcarriers being distributed across system bandwidth;
pseudo-randomly selecting at least one symbol period to send the low reuse preamble; and
sending the at least one OFDM symbol for the low reuse preamble in the at least one symbol period.

21. The method of claim 20, wherein the base station is synchronous with at least one other base station.

22. A method for wireless communication, comprising:
generating a low reuse preamble comprising a pilot portion and a data portion, the pilot portion comprising pilot symbols used for detection of the low reuse preamble, and the data portion comprising data symbols for information for a base station;
generating at least one orthogonal frequency division multiplexing (OFDM) symbol comprising the pilot symbols on first subcarriers and the data symbols on second subcarriers, the first and second subcarriers being distributed across system bandwidth;
determining at least one symbol period assigned to the base station for sending the low reuse preamble; and sending the at least one OFDM symbol for the low reuse preamble in the at least one symbol period.

23. A method for wireless communication, comprising:
generating a low reuse preamble comprising a pilot portion and a data portion, the pilot portion comprising pilot symbols used for detection of the low reuse preamble, and the data portion comprising data symbols for information for a base station;
generating at least one orthogonal frequency division multiplexing (OFDM) symbol comprising the pilot symbols on first subcarriers and the data symbols on second subcarriers, the first and second subcarriers being distributed across system bandwidth;
selecting at least one symbol period not used by neighbor base stations to send a reference signal or control information; and
sending the at least one OFDM symbol for the low reuse preamble in the at least one symbol period.

24. The method of claim 20, wherein the pilot portion is common for all base stations and the data portion is different for each base station.

25. A method for wireless communication, comprising:
determining frequency resources reserved for sending low reuse preambles, wherein the reserved frequency resources comprise a set of subcarriers; and
detecting for low reuse preambles sent by base stations on the set of subcarriers of the reserved frequency resources, wherein at least one guard subcarrier isolates the set of subcarriers from remaining subcarriers and no transmissions are sent on the at least one guard subcarrier.

26. The method of claim 25, wherein the detecting for low reuse preambles comprises
generating pilot symbols for a pilot portion of a low reuse preamble,
correlating received symbols from the reserved frequency resources with the pilot symbols, and
determining whether a low reuse preamble is detected based on correlation results.

27. The method of claim 26, wherein the generating the pilot symbols comprises generating the pilot symbols based on a Zadoff-Chu sequence.

28. The method of claim 25, further comprising:
deriving a channel estimate based on a pilot portion of a detected low reuse preamble; and
recovering a data portion of the detected low reuse preamble with the channel estimate.

29. The method of claim 25, further comprising:
obtaining at least one of a cell identity (ID), a base station ID, cell information, and resource reservation status and requests from a detected low reuse preamble.

30. The method of claim 25, further comprising:
determining whether a detected low reuse preamble is decoded correctly based on a cyclic redundancy check (CRC) included in the detected low reuse preamble.

31. The method of claim 25, wherein the low reuse preambles sent by the base stations comprise a pilot portion common for all base stations and a data portion different for each base station.

32. The method of claim 25, wherein different frequency resources are reserved for sending low reuse preambles by different types of base stations, and wherein the detecting for low reuse preambles comprises detecting for low reuse preambles sent by each type of base stations from frequency resources reserved for the type of base stations.

33. An apparatus for wireless communication, comprising:
means for determining frequency resources reserved for sending low reuse preambles, wherein the reserved frequency resources comprise a set of subcarriers; and
means for detecting for low reuse preambles sent by base stations on the set of subcarriers of the reserved frequency resources, wherein at least one guard subcarrier isolates the set of subcarriers from remaining subcarriers and no transmissions are sent on the at least one guard subcarrier.

34. The apparatus of claim 33, wherein the means for detecting for low reuse preambles comprises
means for generating pilot symbols for a pilot portion of a low reuse preamble,
means for correlating received symbols from the reserved frequency resources with the pilot symbols, and
means for determining whether a low reuse preamble is detected based on correlation results.

35. The apparatus of claim 33, further comprising:
means for deriving a channel estimate based on a pilot portion of a detected low reuse preamble; and
means for recovering a data portion of the detected low reuse preamble with the channel estimate.

36. The apparatus of claim 33, further comprising:
means for obtaining at least one of a cell identity (ID), a base station ID, cell information, and resource reservation status and requests from a detected low reuse preamble.

37. An apparatus for wireless communication, comprising:
means for determining frequency resources reserved for sending low reuse preambles, wherein the reserved frequency resources comprise a set of subcarriers;
means for sending a low reuse preamble on the set of subcarriers of the reserved frequency resources from a base station;
means for using at least one guard subcarrier to isolate the set of subcarriers from remaining subcarriers; and
means for sending no transmissions on the at least one guard subcarrier.

38. An apparatus for wireless communication, comprising:
at least one processor configured to:
determine frequency resources reserved for sending low reuse preambles, wherein the reserved frequency resources comprise a set of subcarriers;
send a low reuse preamble on the set of subcarriers of the reserved frequency resources from a base station;
use at least one guard subcarrier to isolate the set of subcarriers from remaining subcarriers; and
send no transmissions on the at least one guard subcarrier.

39. A computer program product, comprising:
a non-transitory computer-readable medium comprising:
code for determining frequency resources reserved for sending low reuse preambles;
code for sending a low reuse preamble on the reserved frequency resources from a base station;
code for generating the low reuse preamble comprising a pilot portion and a data portion, the pilot portion comprising pilot symbols used for detection of the low reuse preamble, and the data portion comprising information for the base station;
code for generating multiple sequences of pilot symbols based on a Zadoff-Chu sequence; and
code for mapping the multiple sequences of pilot symbols to multiple rows of resource elements used for the pilot portion.

* * * * *